(12) United States Patent
Slater

(10) Patent No.: US 9,379,834 B2
(45) Date of Patent: Jun. 28, 2016

(54) TIME SPACE COHERENCE INTERFEROMETER

(71) Applicant: NEARFIELD SYSTEMS INCORPORATED, Torrance, CA (US)

(72) Inventor: Dan Slater, La Habra Heights, CA (US)

(73) Assignee: NEARFIELD SYSTEMS INCORPORATED, Torrance, CA (US)

( * ) Notice: Subject to any disclaimer, the term of this patent is extended or adjusted under 35 U.S.C. 154(b) by 670 days.

(21) Appl. No.: 13/874,249

(22) Filed: Apr. 30, 2013

(65) Prior Publication Data

US 2013/0294269 A1 Nov. 7, 2013

Related U.S. Application Data

(60) Provisional application No. 61/641,160, filed on May 1, 2012.

(51) Int. Cl.
| | |
|---|---|
| *H04J 3/14* | (2006.01) |
| *H04B 17/391* | (2015.01) |
| *H04W 4/02* | (2009.01) |
| *G01S 1/30* | (2006.01) |
| *G01S 13/90* | (2006.01) |
| *H04J 3/06* | (2006.01) |

(52) U.S. Cl.
CPC .............. *H04J 3/14* (2013.01); *H04B 17/391* (2015.01); *G01S 1/302* (2013.01); *G01S 13/9023* (2013.01); *H04J 3/0635* (2013.01); *H04W 4/02* (2013.01)

(58) Field of Classification Search
None
See application file for complete search history.

(56) References Cited

U.S. PATENT DOCUMENTS

| | | | |
|---|---|---|---|
| 8,462,349 B1* | 6/2013 | Rhoadarmer | G01B 9/02097 356/491 |
| 2002/0152084 A1* | 10/2002 | Main | H03M 3/41 704/500 |
| 2009/0290876 A1* | 11/2009 | Fukuchi | H04B 10/66 398/79 |
| 2012/0281784 A1* | 11/2012 | Beydoun | H03M 1/1028 375/295 |

* cited by examiner

*Primary Examiner* — Michael Thier
*Assistant Examiner* — Eric Myers
(74) *Attorney, Agent, or Firm* — O'Melveny & Myers LLP

(57) ABSTRACT

A time space coherence interferometer (TSCI) system is provided. In one embodiment of the present invention the TSCI system includes an interferometer in communication with an RF source and a receiver. The interferometer includes a first switch, a second switch, a transmit element, a receive element and a sequencer circuit, wherein the sequencer circuit is configured to alternate the first and second switches between first and second configurations. In a first configuration, the signal from the RF source is provided to the transmit element, where it is communicated to the receive element via a signal path, and provided to the receiver. In the second configuration, the signal from the RF source is provided to the receiver via a reference path. The switching sequence results in a complex ratio of the signal path signal to the reference path signal (e.g., an S21 transmission ratio) being provided to the receiver.

20 Claims, 12 Drawing Sheets

TIME SPACE COHERENCE INTERFEROMETER

RELATED APPLICATIONS DATA

This application claims priority pursuant to 35 U.S.C. §119 (e) to U.S. provisional patent application, Ser. No. 61/641,160, filed May 1, 2012, the subject matter of which is incorporated by reference herein in its entirety.

BACKGROUND OF THE INVENTION

1. Field of the Invention

The present invention relates to interferometers, and more particularly, the use of reference signal coherence and time division multiple access to perform interferometry by encoding reference and signal data into data streams and decoding measurement parameters such as S21 parameters from the received data stream. In addition to measuring S21 parameters, the present invention extracts measurement trigger timing and additional metadata from the data stream.

2. Description of Related Art

Near-field measurement of an antenna phase front requires a spatially distributed set of complex S21 RF transmission measurements. The phase front measurement is made using a spatially scanning microwave interferometer. The interferometer has two paths, a signal path that includes an antenna under test and a test probe, and a separate reference path. The complex ratio of the signal path signal to the reference path signal gives the desired S21 transmission ratio.

These near-field measurement systems become expensive as measurement rates increase. Additionally, all characteristics of the transmitted wave are reduced to a single measurement of the S21 transmission ratio at each spatial location, and potentially useful metadata is lost.

FIG. 1 depicts the architecture of a near-field measurement system typical of the prior art. A Radio Frequency ("RF") source 102 is split 104 into a signal path 106 and a reference path 108. One input of the receiver 110 is connected to the reference path. The signal path has a transmit 112 and receive 114 element, and the receive element connects to a second input of the receiver 110. Signal 109 shows the time domain waveforms of an example RF source signal that has passed through the reference path and signal 107 shows the time domain waveform of the same RF source signal after passing through the signal path. As shown, the signal path waveform 107 has an amplitude and phase shift relative to the reference path signal. Within the receiver the signals from the signal path and reference path are converted into complex form by a digital quadrature down converter or by a Hilbert transform and are input into a complex divider 116. When an external trigger 118 is input into the receiver, the result of the complex division is present as an output of the receiver 120. S21 is a complex number representing the convolution of the two antenna characteristics. This number is used to characterize the antenna under test, which can be the transmit element 112 or the receive element 114. The information is stored in a data array position corresponding to the relative spatial location of the receive element 114 at the time of the trigger. By physically moving the transmit and receive elements relative to one another and obtaining an S21 measurement at each location triggered by the trigger 118, an amplitude and phase front for different spatial locations relative to the transmit element can be mapped.

SUMMARY OF THE INVENTION

The present invention is directed toward using reference signal coherence and time division multiple access (TDMA) to perform interferometry by encoding reference and signal data into data streams and decoding measurement parameters such as S21 parameters from the received complex I/Q data stream.

A first embodiment of the present invention includes a time space coherence interferometer (TSCI) utilizing a single input receiver. A radio frequency (RF) source is input into an RF switch. One pole of the switch connects the RF source to the transmit antenna of the signal path. The second pole of the switch connects the RF source with the reference path. A second RF switch connects to a single input receiver. The second RF switch first pole connects to the receive antenna on the signal path, and the second pole connects to the reference path. The two switches are both controlled by a sequencer circuit. During quiescent operation, the switches are positioned to connect the RF source and the receiver directly along the reference path. When the trigger arrives, the controller sets switches toward the signal path for an amount of time constituting a measurement interval. In this embodiment, the switching sequence results in the receiver seeing an alternation between the reference signal for a certain amount of time followed by seeing a measurement signal for a measurement interval upon trigger arrival. To aid the process of downstream decoder synchronization, a zero reference can be inserted into the sequence by setting RF switches in opposite directions. During this time period, the receiver sees a noise signal.

In an alternate embodiment, the first RF switch is replaced with a power-splitter to send the source signal to both the reference path and the signal path. In accordance with this embodiment, the second RF (or receiver side) switch may further be configured to switch to a zero reference, thereby disconnecting the receiver from both the signal path and the reference path.

Operation of the interferometer relies on the temporal coherence of the reference signal being longer than the measurement interval. The system should be designed such that phase noise internal to the interferometer system does not significantly affect the temporal correlation. The receiver continuously streams a down converted I/Q signal to a stream decoder or a data file that can be parsed later. The receiver can be implemented using a Software Defined Radio, which has the advantage of having a high performance to cost ratio relative to the traditional receivers used in interferometers in the prior art.

In another embodiment of the present invention, the system includes a stream encoder, streaming receiver, and stream decoder. In this embodiment, the system utilizes a digital down-converter (DDC) and corresponding decoder. The encoded measurement signal is input to the streaming receiver where it is digitized by an analog to digital (A/D) converter. A numerically controlled oscillator (NCO) provides a complex I/Q input to the quadrature digital down-converter (DDC) which mixes and converts the digitized measurement signal into an intermediate frequency (IF) I/Q data stream. The DDC output is run through a cascaded integrator comb (CIC) or integrator decimation filter to reduce the required sampling rate of the decoder.

In the stream decoder, after optional CIC filter deconvolution, the I/Q stream is then down-converted to baseband and sent to a parser that separates the encoded measurement data and phase reference signal from the data stream. The decoder detects directly encoded trigger data or detects the sync from the zero signal and activates the signal gate. The demultiplexer separates the data into separate vectors when multiple measurements are taken in a multi-beam measurement. The parser can also perform metadata extraction from the baseband I/Q stream. Metadata information such as measurement timing, pulse profile, pulse timing, scan velocity, and signal quality can be extracted, and the metadata can be related to a specific temporal or spatial measurement location by storing the data in memory arrays similar to the way vector S21 measurements are stored.

Once the measurement is complete the parser activates the reference gate and adjusts the internal oscillator to match the reference signal. The numerically controlled oscillator (NCO) phase & frequency lock controller combines a gain signal from the reference coherence estimator with the complex IF reference signal input to control the NCO. If the NCO maintains a perfect phase and frequency relationship with the reference, the quadrature (Q) baseband data stream will have zero value. However, when the NCO signal has drifted from the reference, the fastest reference lock is achieved when the reference coherence estimator assigns the first reference sample a normalized weight of 1. The first sample provides the instantaneous phase of the reference, and a second sample can be used to determine the reference frequency. Phase fluctuations in the reference over time can be averaged out using an exponentially mapped past (EMP) weighting of the reference samples, providing a stable reference for the downconverter during the sampling interval. Because most reference source signals do not maintain phase coherence during a frequency change, multi-frequency measurements require a TSCI receiver to re-measure the reference after a frequency change. This can result in a significant loss of available measurement time that does not occur with an interferometer typical of the prior art.

A more complete understanding of a time space coherence interferometer will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

An embodiment of the present invention includes an apparatus and method for using reference signal coherence and time division multiple access (TDMA) to perform interferometry by encoding reference and signal data into digital data streams and decoding measurement parameters such as S21 parameters from the received complex I/Q data stream.

Figure 1:
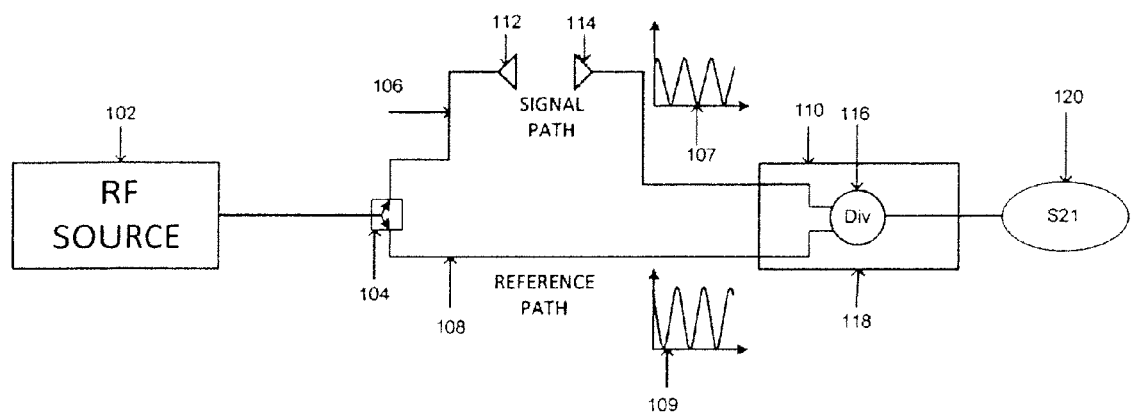
FIG. 1 depicts an interferometer typical of the prior art utilizing a two input receiver.
Figure 2:
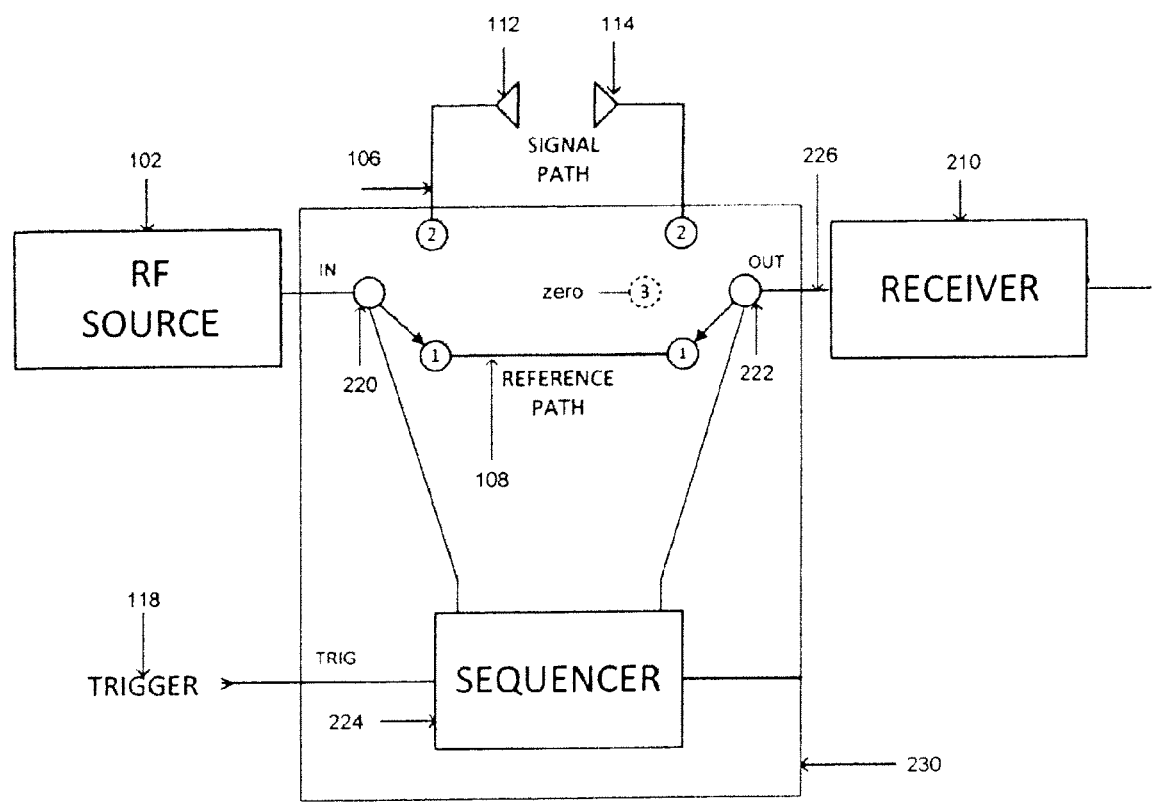
FIG. 2 depicts TSCI interferometer encoder utilizing a single channel receiver by encoding reference and signal paths using into a single data stream.

A first embodiment of the present invention is shown in FIG. 2, which depicts a time space coherence interferometer (TSCI) utilizing a single input receiver. RF source 102 is input into an RF switch 220. One pole of the switch connects the RF source to the transmit antenna 112 of the signal path 106. The second pole of the switch connects the RF source with the reference path 108. A second RF switch 222 connects to a single input receiver 210. The second RF switch first pole connects to the receive antenna 114 on the signal path, and the second pole connects to the reference path. The two switches are both controlled by a sequencer circuit 224. During quiescent operation, the switches are positioned to connect the RF source 102 and the receiver 210 directly along the reference path. When the trigger arrives, the controller sets switches 220 and 222 toward the signal path for an amount of time constituting a measurement interval. In this embodiment, the switching sequence results in the receiver seeing an alternation between the reference signal for a certain amount of time followed by seeing a measurement signal for a measurement interval upon trigger arrival. One skilled in the art will recognize this time based sequencing as a form of Time Division Multiple Access (TDMA). To aid the process of downstream decoder synchronization, a zero reference can be inserted into the TDMA sequence by setting RF switches 220 and 222 in opposite directions. During this time period, the receiver sees a noise signal.

In an alternate embodiment, the first RF switch 220 is replaced with a power-splitter (not shown) to send the source signal to both the reference path and the signal path. In accordance with this embodiment, the receiver side switch 222 may further be configured to switch to a zero reference, thereby disconnecting the receiver from both the signal path and the reference path.

Operation of the interferometer relies on the temporal coherence of the reference signal being longer than the measurement interval. The system should be designed such that phase noise internal to the interferometer system does not significantly affect the temporal correlation. The receiver continuously streams a down converted I/Q signal to a stream decoder or a data file that can be parsed later. The receiver can be implemented using a Software Defined Radio, which has the advantage of having a high performance to cost ratio relative to the traditional receivers used in interferometers in the prior art.

Figure 3:
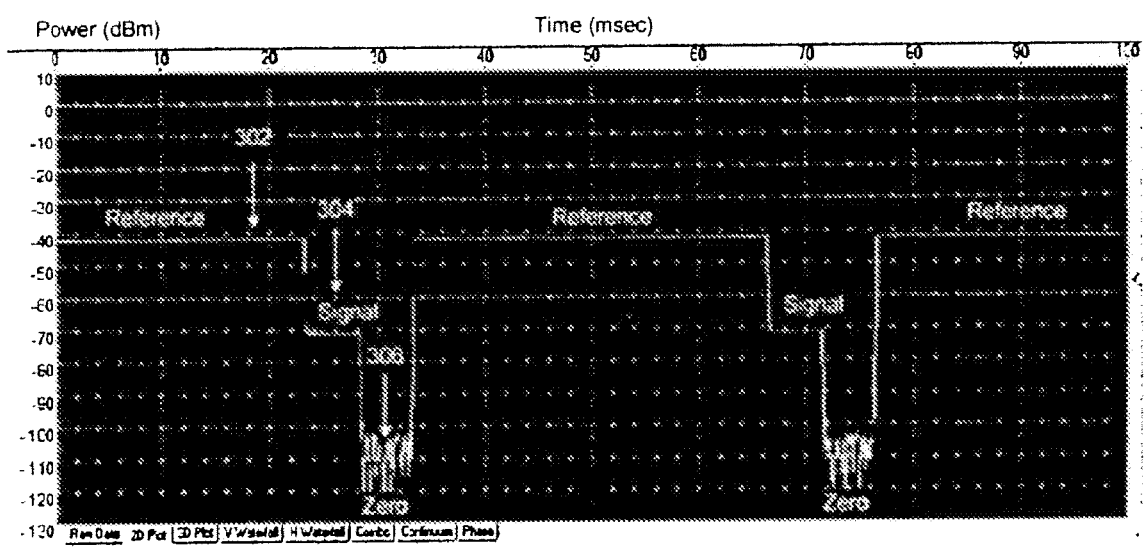
FIG. 3 depicts an amplitude plot of an encoded TSCI signal.

FIG. 3 depicts an example of an amplitude plot of a TDMA encoded TSCI signal. While the reference signal 302 is selected, the reference phase information is available to the receiver. Once a trigger arrives, the sequencer controls the switches such that the transmit signal 304 is inserted into the stream. The sequencer momentarily selects the zero reference signal 306 to help the decoder form a synchronization pattern. A short time after the zero reference signal is measured, the sequencer selects the reference signal again until another trigger pulse arrives. In another embodiment of the present invention the control circuit responds by first switching from the reference signal to the zero reference signal and then switching to the measurement signal, thus providing the synchronization ahead of the measurement. This synchronization method does not require a long buffer for real time transmit signal measurement, but has the disadvantage of delaying the measurement by the duration of the zero reference signal. Having the transmission signal come before the zero reference signal allows the minimum amount of time between a reference measurement and a transmission signal measurement, but requires a long data buffer when the data is being processed in real time.

Figure 4A:
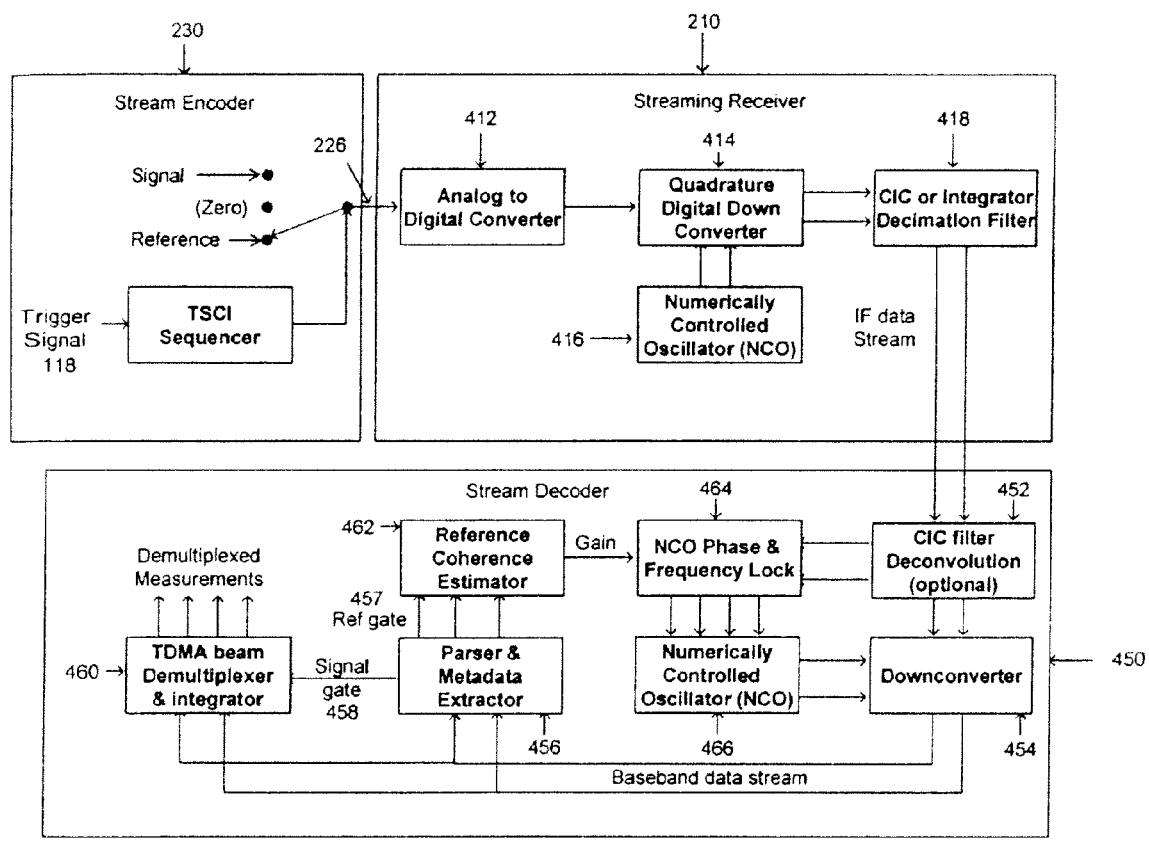
FIGS. 4a and 4b depict two variations of an embodiment of a TSCI interferometer, including a stream encoder, a streaming receiver, and a stream decoder.
Figure 4B:
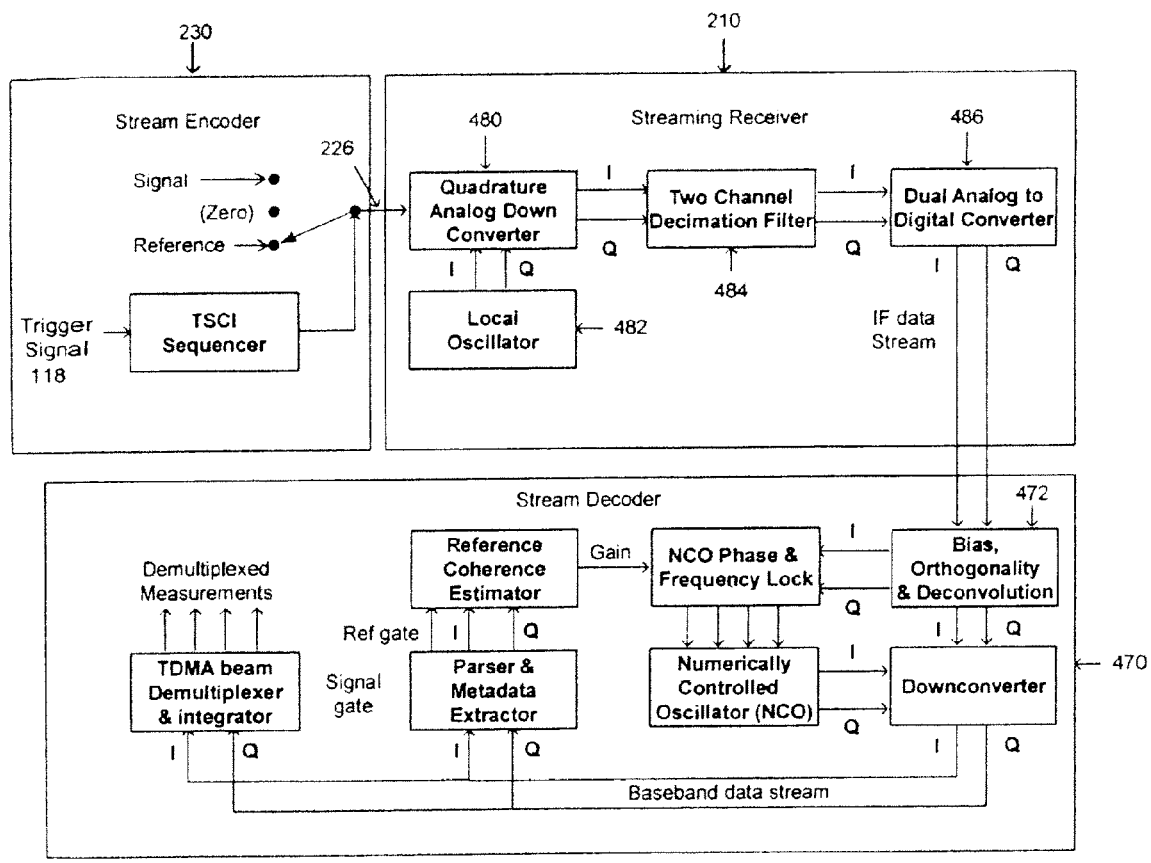

FIGS. 4a and 4b depict the architecture of a TSCI measurement system including a stream encoder, streaming receiver, and stream decoder. FIG. 4a depicts the architecture of a TSCI measurement system utilizing a digital down-converter (DDC) and corresponding decoder. The encoded measurement signal 226 is input to the streaming receiver 210 where it is digitized by an analog to digital (A/D) converter 412. A numerically controlled oscillator (NCO) 416 provides a complex I/Q input to the quadrature digital down-converter 414 (DDC) which mixes and converts the digitized measurement signal into an intermediate frequency (IF) I/Q data stream. The DDC output is run through a cascaded integrator comb (CIC) or integrator decimation filter 418 to reduce the required sampling rate of the decoder 450. CIC filters are typical in commercial SDR radios and suffer from crosstalk between samples. This behavior is undesirable for TSCI measurement because the encoded stream is switching between the reference, zero, and signal measurements and the measurements are smeared together.

The stream decoder 450 has an optional CIC filter deconvolution 452 into a TDMA matched filter response to remove this smearing effect. Alternatively, a simple integrator decimation filter decouples the measurements from each other, but suffers from the disadvantage of creating a somewhat larger data word size. The I/Q stream is then down-converted to baseband and sent to a parser 456 that separates out the encoded measurement data and phase reference signal from the data stream. The decoder detects directly encoded trigger data or detects the sync from the zero signal and activates the signal gate 458. The demultiplexer 460 separates the data into separate S21 vectors when multiple measurements are taken in a multi-beam measurement (see FIG. 5 description). The parser 456 can also perform metadata extraction from the baseband I/Q stream. Metadata information such as measurement timing, pulse profile, pulse timing, scan velocity, and signal quality can be extracted, and the metadata can be related to a specific temporal or spatial measurement location by storing the data in memory arrays similar to the way vector S21 measurements are stored. Once the measurement is complete the parser activates the reference gate 457 and adjusts the internal oscillator to match the reference signal. The numerically controlled oscillator (NCO) phase & frequency lock controller 464 combines a gain signal from the reference coherence estimator 462 with the complex IF reference signal input to control the NCO. If the NCO maintains a perfect phase and frequency relationship with the reference, the quadrature (0) baseband data stream will have zero value. However, when the NCO 466 signal has drifted from the reference, the fastest reference lock is achieved when the reference coherence estimator assigns the first reference sample a normalized weight of 1. The first sample provides the instantaneous phase of the reference, and a second sample can be used to determine the reference frequency. Phase fluctuations in the reference over time can be averaged out using an exponentially mapped past (EMP) weighting of the reference samples, providing a stable reference for the down-converter during the sampling interval. Because most reference source signals do not maintain phase coherence during a frequency change, multi-frequency measurements require a TSCI receiver to re-measure the reference after a frequency change. This can result in significant loss of available measurement time that does not occur with an interferometer typical of the prior art.

FIG. 4b depicts the architecture of a TSCI measurement system utilizing a quadrature analog down-converter (QAD) and corresponding decoder. A local oscillator 482 ("LO") and the encoded data stream 226 are inputs to a quadrature analog down-converter 480. The TDMA encoded signal is mixed with the I/Q LO to form IF I/Q analog signals. Each analog signal is passed through one channel of a two channel decimation filter 484. Then, the two channel outputs are digitized by a dual A/D converter 486 into an I/Q digital data stream and input into the decoder 470. Because down-converting and filtering were performed in analog and then digital streams created from two different A/D converters, the process results in potential bias and orthogonality offsets. The decoder can optionally compensate for these offsets 472. Additionally, the filter characteristics of the decimation filter can be deconvolved to achieve an appropriate TDMA matched filter response 472. Once these signal conditioning steps are completed, the remainder of the stream decoder operation is identical to the steps depicted in FIG. 4a and described above.

Figure 5:
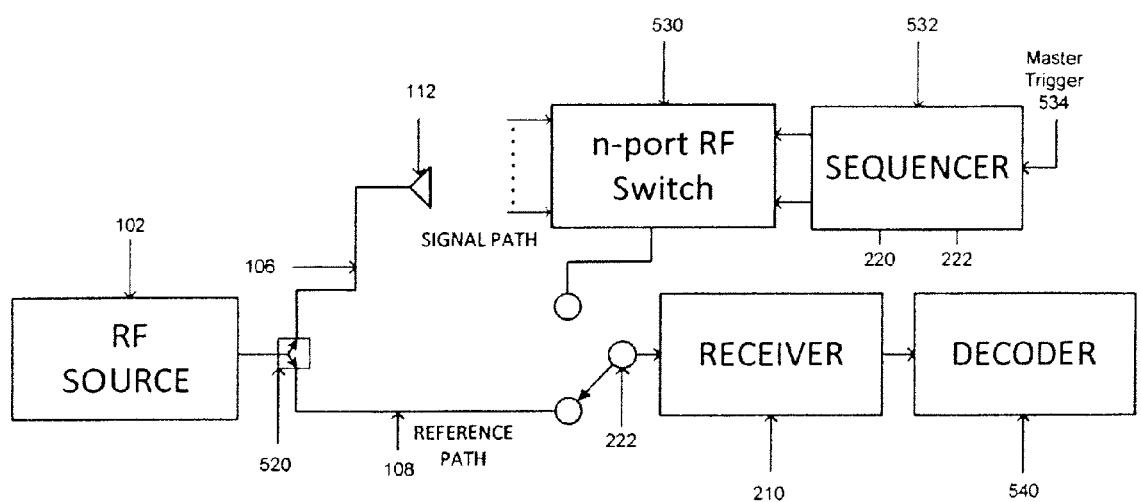
FIG. 5 depicts an embodiment of the TSCI interferometer configured for multi-beam measurement.

While the present invention has been described in terms of a single transmit channel measurement corresponding to each time space trigger, the technique of sharing a single channel for measurement and reference data can be used to take multiple data samples for each trigger. FIG. 5 depicts an interferometer system using a single channel receiver for multi-beam measurement. The RF source 102 is split by power splitter 520 to transmit antenna 112 and to reference path input of switch 222. On the receive side of the signal path, an n-port RF switch 530 is controlled by a sequencer circuit 532. In the quiescent state, the switches connect the source 102 and the receiver 210 along the reference path. When the sequencer receivers a master trigger signal 534 a measurement sequence begins. The sequencer toggles the switches 222 onto the signal path. The sequencer then steps the n-port RF switch through each of the ports to obtain a measurement. Either the first or the last port can optionally be used to provide a zero reference signal for synchronization in the decoder. The total measurement interval for all of the ports should not exceed the reference signal coherence time. If the reference coherence time is too short for measuring all ports, additional reference measurements can be interspersed into the measurement sequence. The receiver produces a data stream that includes the measurement of the reference signal along with measurement data from the various ports of the n-port switch and an optional zero to aid in synchronization. As described above the decoder 540 can separate each of the port measurements into an array of S21 parameters for each of the n-port switch inputs as well as processing additional metadata that would normally be lost (see FIG. 4a). All of the measurements taken from a single trigger will be placed into the same corresponding temporal/spatial location in the respective arrays associated with the trigger. Although the system has been described in terms of the n-port RF switch being located on the receiver side of the signal path, this n-port switching technique can also be used to change the beam characteristics on the transmit side to perform multi-beam measurements.

A cyclostationary free space phase reference system can be used to provide a phase reference signal for antennas with normally inaccessible embedded RF sources. Cyclostationary processes exhibit temporal and/or spatial periodicity in the mean, correlation and spectral descriptors. Equivalently, cyclostationary signals have an autocorrelation function that is periodic in time or space. This concept is the basis of a technique that produces phase coherent measurements when the phase reference signal is not directly accessible, as in the case of antennas driven directly by embedded RF sources. The simplest approach assumes a repetitive cyclic spherical or cylindrical scan type. Consider a spherical $\theta$ over $\phi$ near-field antenna measurement system. Assume that the $\theta$ axis is stationary while the $\phi$ axis spins rapidly at a constant rate. The vector S21 transmission ratio will repeat every $\phi$ rotation, except for a noise component. Now consider breaking the wired reference path through the $\phi$ axis rotary joint and measuring the S21 transmission ratio using an arbitrarily tuned, fixed frequency local oscillator. The S21 transmission ratio will repeat every rotation but with a constant rate phase drift that corresponds to the integral of the frequency offset between the RF source and local oscillator.

Figure 6:
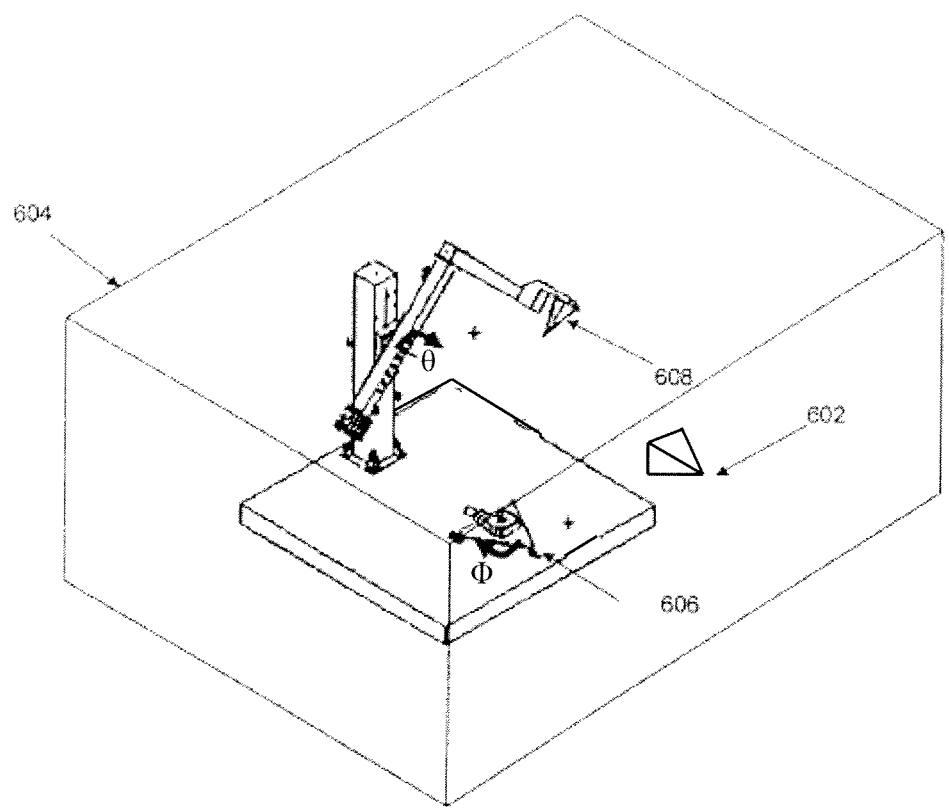
FIG. 6 depicts a TSCI measurement configuration utilizing a stationary horn antenna to measure a cyclostationary free space phase reference.

FIG. 6 depicts a TSCI measurement configuration utilizing a stationary horn antenna to measure a cyclostationary free space phase reference. For example, this system can be used when the antenna under test is embedded within a mobile device without a readily accessible electrical connection to the on board reference signal. The advantages of this approach are that no rotary joint is needed, and even more importantly, the RF source can be embedded in the test antenna without any external cable connections. This is particularly helpful when the test configuration requires the source antenna to be rotated, such as a spherical or cylindrical interferometer. In this embodiment, a stationary reference antenna 602 is attached at a fixed location in the transmission area of the antenna under test. For example, the probe could be attached to the wall of a test chamber 604. The antenna under test 606 rotates about a $\phi$ axis while the measurement probe 608 rotates around a $\theta$ axis after a complete $\phi$ axis rotation, creating a spherical scan pattern. During the measurement sequence, the $\phi$ axis spins rapidly at a constant rate. The stationary reference antenna 602 receives a cyclostationary time varying phase reference signal that repeats except for a constant rate phase drift in the system. As described below, the reference phase can be extracted from the received signal.

Figure 7:
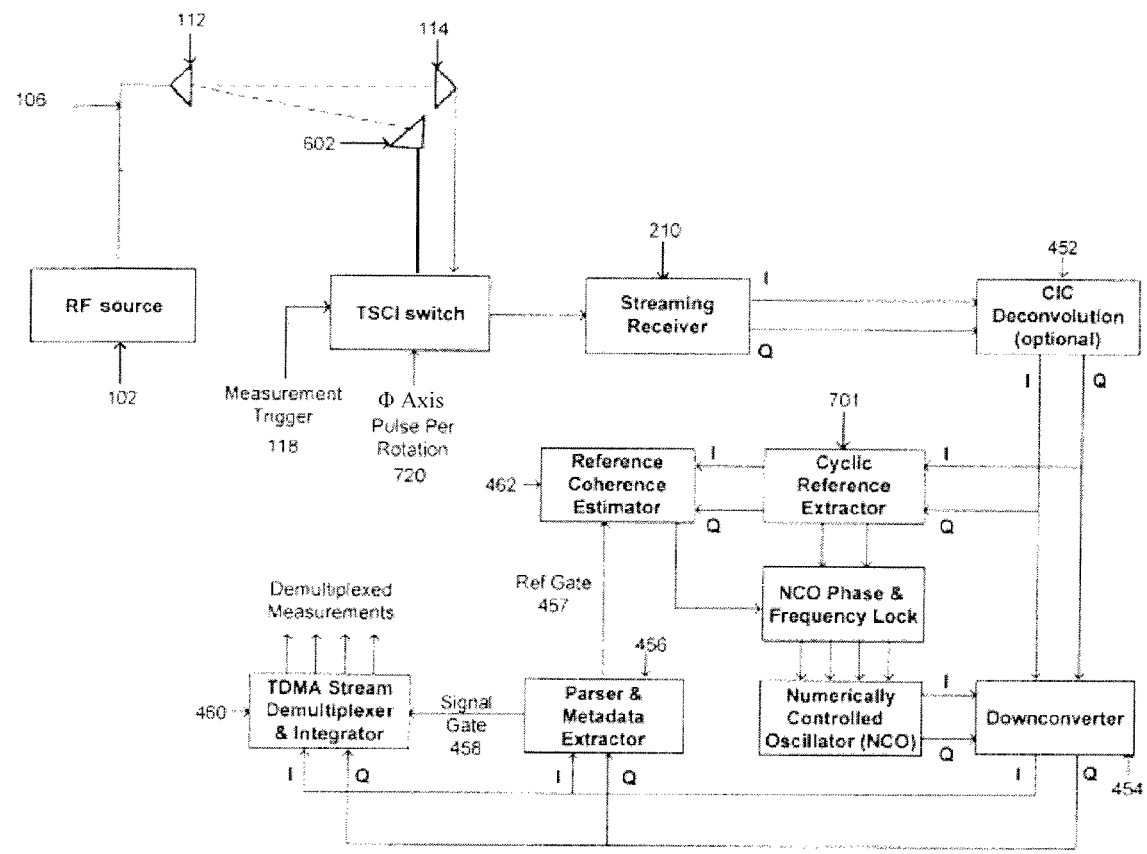
FIG. 7 depicts a block diagram of a TSCI cyclostationary reference system.

FIG. 7 illustrates a block diagram of a TSCI cyclostationary reference system. Instead of passing a signal directly from a reference during the quiescent state, the TSCI switch is in the position to pass the reference probe signal to the receiver. The TSCI switch is also used to encode the pulse per rotation 720 signal from the $\phi$ axis encoder into the data stream. The receiver 210 converts the incoming data into an IF I/Q data stream. An optional CIC deconvolution filter 452 can be used when needed as described in FIG. 4. Decoding the cyclostationary stream is more complex than standard TSCI stream decoding. The first step is to extract a stationary phase reference signal in the cyclic reference extractor 701. A cyclostationary signal rejection filter, inside extractor 701, is used to extract the desired time varying phase reference signal which is then used by a largely conventional TSCI decoder.

The cyclostationary reference signal vector R(t) is an arbitrary complex waveform that repeats, except for noise and phase drift, once per rotation of the $\phi$ axis. The phase drift term is what we are interested in as it corresponds to the desired phase reference signal. The time term t (seconds), is a function of $\phi$ and n, where $\phi$ is the axis rotation angle in radians and n is the $\phi$ axis rotation count. For a constant rotation at a rate of v rotations/sec: t=v (n+$\phi$/2 $\pi$).

The cyclostationary component is suppressed by derotating the nth cyclostationary reference waveform relative to the previous (n−1)th cyclostationary reference waveform. The residual signal, ref(t) is the desired phase reference signal plus noise: ref(t)=R($\phi$, n)·$\overline{R}$($\phi$, n−1).

The $\phi$ axis phase lock timing can be readily extracted using autocorrelation methods but a preferred approach is to lock the timing directly to the $\phi$ axis sensor index which produces one pulse per rotation (PPR). The PPR signal is embedded into the TSCI RF data stream along with the cyclostationary phase reference signal and the spatial division multiple access (SDMA) measurement locations. The stream decoding after extracting the reference signal is largely the same as conventional TSCI stream decoding with modifications to accept the intermittent stationary reference signal (see FIG. 4a).

Figure 8:
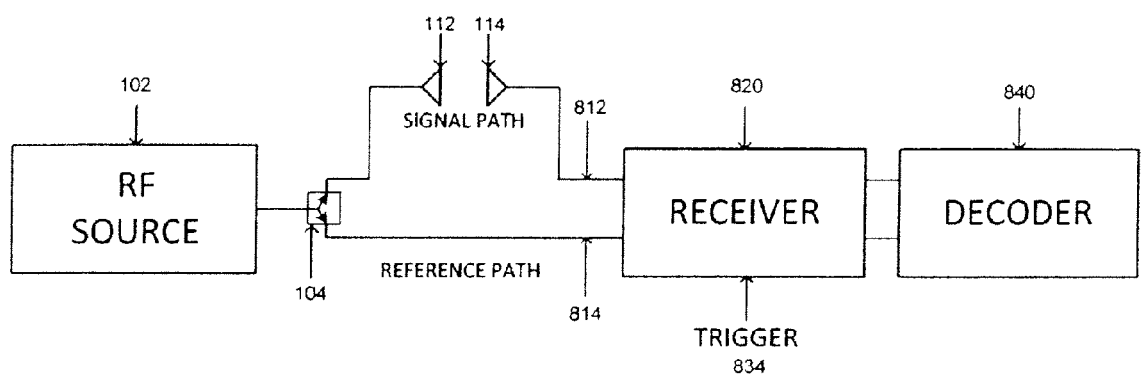
FIG. 8 depicts a TSEI interferometer utilizing a two input receiver.

Although the present invention has been described with an encoded signal and a single channel receiver, a variation of the technique called time space encoded interferometry (TSEI) is applicable without dependence on reference signal coherence when used with a two channel receiver. FIG. 8 depicts an embodiment of a TSEI interferometer utilizing a two channel receiver. The two input receiver is configured to take a measurement signal input in the first channel 812 and a reference signal input in the second channel 814.

Figure 9:
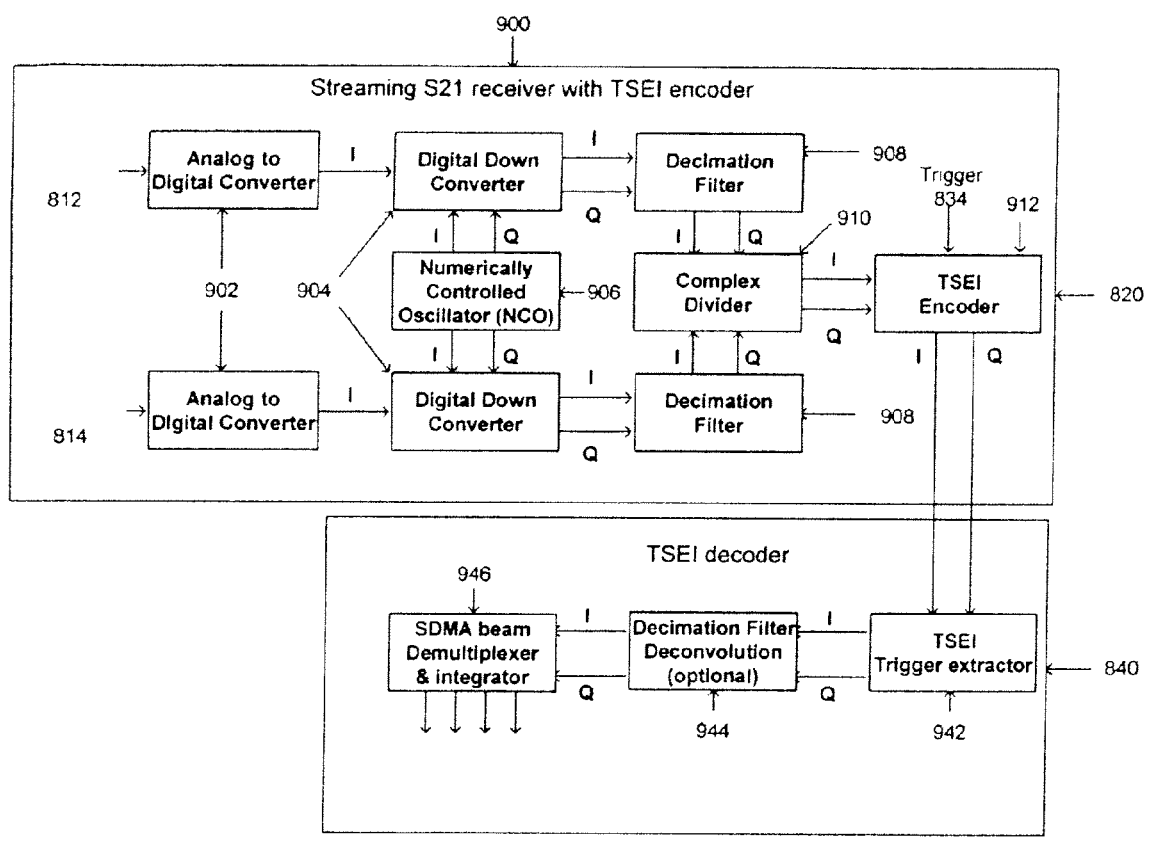
FIG. 9 depicts an embodiment of a TSEI interferometer, including a stream encoder, a streaming receiver, and a stream decoder.

FIG. 9 depicts an embodiment of the receiver and stream decoder for a TSEI interferometer. In the receiver 900 the signal 812 and reference 814 are digitized by two (A/D) converters 902. Each A/D converter output is digitally down-converted 904 to an IF complex I/Q signal. A numerically controlled oscillator (NCO) 906 provides the local oscillator signal to each DDC. A complex divide 910 of the signal and reference IF I/Q signals provides baseband transmission characteristics (S21) of the measured signal. The measurement trigger 834 is encoded into the I/Q data stream using a reserved I/Q data value or lower significant bits of the data stream. The trigger's arrival is associated with a temporal and/or spatial measurement location of the measurement signal. The TSEI decoder 840 begins by extracting the encoded trigger from the I/Q stream in the trigger extractor 942. The decimation filter characteristics can be deconvolved using decimation filter deconvolution 944 if necessary depending on whether the decimation filter used potentially distorts the data. Finally, a beam demultiplexer 946 demultiplexes antenna measurements into data arrays corresponding to multi-beam measurements as well as optionally providing metadata measurements. It should be noted that the TSEI receiver does not depend on coherence of the reference signal, and as a result the reference does not need to be re-measured after a frequency change. Also, the decoder itself has a simpler structure because it does not need to reconstruct the reference phase. It should also be noted that because there are two input channels, close proximity of the inputs might lead to channel coupling.

One of ordinary skill in the art will recognize that with the availability of increasingly sophisticated software defined radios, the described streaming decoder functions can be implemented directly within the receiver. Although the invention has been described with discrete receiver and decoder components, it should be noted that an interferometer that distributes and orders the described receiver and decoder functions in an analogous fashion falls within the spirit and scope of the present invention.

Figure 10:
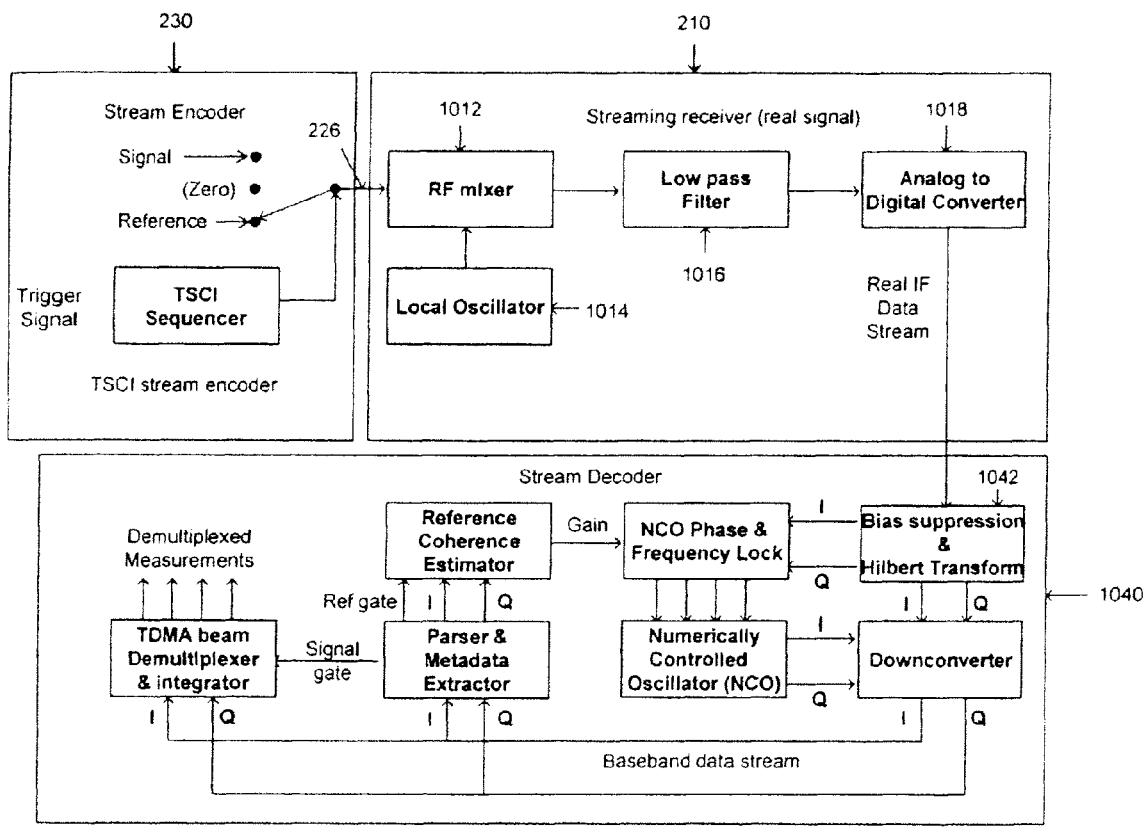
FIG. 10 depicts an embodiment of a TSCI interferometer utilizing a real signal streaming receiver.

The TSCI technique can also be applied using a single channel receiver with a real signal output using a relatively simple streaming receiver structure. FIG. 10 depicts a TSCI interferometer utilizing a streaming receiver 210 with a real signal IF output. The receiver utilizes an entirely real signal chain, with the encoded TSCI stream data 226 mixed with a local oscillator 1014 frequency in the RF mixer 1012. The IF mixer output is passed through a lowpass filter 1016 before being digitized at an A/D converter 1018. The decoder 1040 has a similar configuration to the decoders described in FIGS. 4a and 4b. The difference is that the IF real input signal must first be converted into an IF complex data stream by the decoder. This is accomplished by suppressing any bias in the receiver, and performing a Hilbert transform to convert the real signal into a complex signal (1042).

Figure 11:
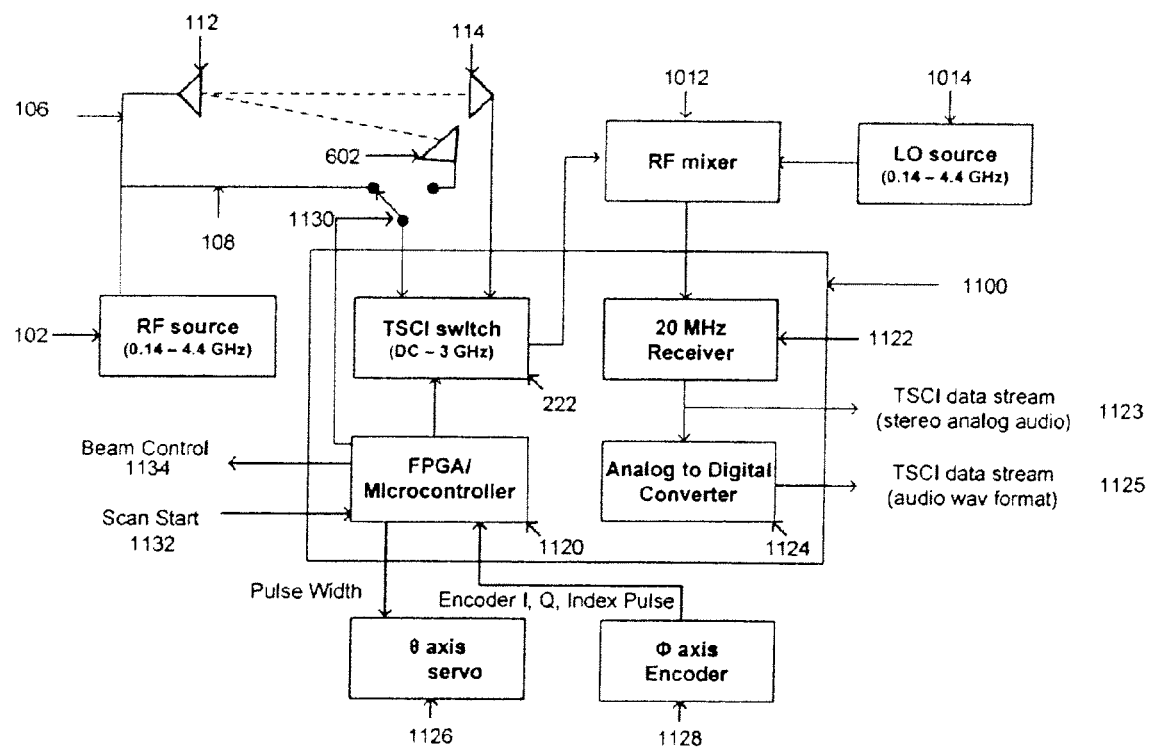
FIG. 11 depicts an embodiment of a TSCI interferometer implemented on a small test board using a FPGA or Microcontroller to perform key TSCI functions.

FIG. 11 depicts a block diagram of an embodiment of the present invention comprising a spherical coordinate time space coherence interferometer test system. In this embodiment, the key concepts of a TSCI control system can be demonstrated using a switch 222, a FPGA or microcontroller 1120, a quadrature down-converter receiver 1122, and an A/D converter 1124 all residing on a small test board 1100. The interferometry measurement sequence is carried out by moving the antenna elements 112 and 114 relative to one another and taking measurements for each spatial location in order to sweep out a hyper-hemisphere. An RF source 102 drives an antenna under test 112. The reference path 108 and signal path 106 are encoded into a TDMA/SDMA sequence by the TSCI switch 222. The TDMA/SDMA encoded measurement is down-converted in an RF mixer with an LO 1014 frequency chosen to provide a 20 MHz IF mixer output. The 20 MHz receiver 1122 on the test board converts the signal to base band and generates a quadrature output. The receiver's output is an analog audio TSCI data stream 1123. By running the analog stream through an A/D Converter 1124, the data stream can be output as an audio (.wav) file. Measurements and metadata for each spatial location can be parsed into arrays by a TSCI stream decoder.

A single microcontroller or FPGA 1120 can perform all of the control functions of the interferometer test system. For example, an Arduino Uno microcontroller has been used to demonstrate the TSCI interferometry concept. As noted above, the controller encodes the data stream using the TSCI switch 222. The controller also has a select signal 1130 to select between using the reference signal or a reference derived from a cyclostationary measurement. This configuration can be used to demonstrate the viability of reference reconstruction using a cyclostationary process by comparing interferometry measurements using the RF source with a second measurement set from the reconstructed reference measured by the stationary reference antenna 602. An interferometer scan sequence is commenced by a scan start pulse 1132. In the embodiment shown, spatial location information in the φ axis is obtained by the controller from a rotary encoder 1128. As the encoder rotates, a quadrature pulse stream indicates a rotational increment and the direction of rotation. The encoder also provides an index pulse with each full 360 degree rotation. A measurement is taken at each spatial location, or by using the techniques described in FIG. 5 and providing an additional beam control output 1134, the system can collect multiple beam measurements per spatial location. The φ axis encoder index pulse is detected and used to increment the θ axis servo once per full rotation of the φ axis. Eventually, the sample points will cover a hyper-hemisphere. As an alternative to rotating the θ once per φ axis rotation, a more efficient approach is to move both axes simultaneously, producing a spiral scan. The spiral scan function can also be easily implemented in the controller 1120. While a programmable device such as an FPGA or a microcontroller provides flexibility, one skilled in the art will recognize that the encoding and other control functions of the FPGA/Microcontroller 1120 can also be accomplished using any other suitable technology, including the use of an ASIC.

Having thus described several embodiments of a time space coherence interferometer, it should be apparent to those skilled in the art that certain advantages of the system and method have been achieved. It should also be appreciated that various modifications, adaptations, and alternative embodiments thereof may be made within the scope and spirit of the present invention. The invention is solely defined by the following claims.

What is claimed is:

1. An interferometer, comprising:
   an input terminal in communication with a radio frequency (RF) source;
   an output terminal in communication with a receiver;
   a receive element;
   a transmit element configured to transmit a signal from said RF source to said receive element via a signal path;
   a sequencer for transmitting a switch signal; and
   a switch in communication with said sequencer and configured to receive said switch signal and to switch between at least two configurations in response to said switch signal, wherein a first one of said at least two configurations is used to connect said receive element to said output terminal, and a second one of said at least two configurations is used, at least in part, to connect said input terminal to said output terminal via a reference path, said reference path being separate and distinct from said signal path;
   wherein alternating said switch between at least said first configuration and said second configuration results in an encoded measurement signal being transmitted to said receiver via said output terminal,
   wherein said encoded measurement signal can be used to determine a complex ratio of said signal from said RF source as transmitted via said signal path to said signal from said RF source as transmitted via said reference path.

2. The interferometer of claim 1, further comprising a second switch in communication with said sequencer and configured to switch between at least two configurations, wherein a first one of said at least two configurations is used to connect said transmit element to said input terminal, and a second one of said at least two configurations is used, at least in part, to connect said output terminal to said input terminal via said reference path.

3. The interferometer of claim 1, further comprising a splitter connected between said input terminal, said transmit element, and said reference path, said splitter being used to provide said signal from said RF source to both said transmit element and said reference path.

4. The interferometer of claim 3, wherein said switch is further configured to switch between at least three configurations in response to said switch signal, wherein said third one of said at least three configurations is used to disconnect said output terminal from both said receive element and said input terminal.

5. The interferometer of claim 1, further comprising said receiver and a decoder, wherein said receiver is configured to digitize and process said encoded measurement signal, and said decoder is configured to receive a resultant signal from said receiver and to detect at least one of switch data and sync data from said resultant signal.

6. The interferometer of claim 5, wherein said decoder is further configured to extract metadata from said resultant signal.

7. The interferometer of claim 6, wherein said metadata includes at least one of measurement timing, pulse profile, pulse timing, scan velocity, and signal quality.

8. A method for mapping an amplitude and phase front for different spatial locations relative to a transmit element, comprising:
- receiving a signal from a signal source, said signal source being one of a radio frequency (RF), optical and audio source;
- communicating said signal to at least one receive element via a first path;
- communicating said signal to a switch via a second path, said second path being separate and distinct from said first path;
- generating a switch signal;
- using said switch signal to alternate between at least first and second switch settings for said switch, wherein said first switch setting results in said signal as communicated via said first path being provided to a receiver, and said second switch setting results in said signal as communicated via said second path being provided to said receiver;
- wherein said steps of alternating between said first and second switch settings results in an encoded measurement signal being provided to said receiver.

9. The method of claim 8, further comprising the step of transmitting said switch signal to said switch.

10. The method of claim 8, further comprising the steps of generating a second switch signal and transmitting said second switch signal to a second switch.

11. The method of claim 10, wherein said steps of communicating said signal to said at least one receive element via said first path and communicating said signal to said switch via said second path further comprise, using said second switch signal to alternate between at least first and second switch settings for said second switch, wherein said first switch setting results in said signal as received from said signal source being provided to a transmit element, and said second switch setting results in said signal as receive from said signal source being provided to said switch.

12. The method of claim 8, further comprising the step of splitting said signal received from said signal source into two signals, said first one of said two signals being communicated over said first path, and said second one of said two signals being communicated over said second path.

13. The method of claim 8, wherein said step of using said switch signal to alternate between at least first and second switch settings, further comprises using said switch signal to alternate between at least first, second and third switch settings, wherein said third switch setting results in said receiver being disconnected from both said first path and said second path.

14. The method of claim 8, further comprising the steps of digitizing said encoded measurement signal and receiving said at least one switch data and sync data from said digitized encoded measurement signal.

15. The method of claim 14, further comprising the step of extracting metadata from said digitized encoded measurement signal, said metadata including at least one of measurement timing, pulse profile, pulse timing, scan velocity, and signal quality.

16. A method for using an interferometer for providing an encoded measurement signal to a receiver, comprising:
- receiving a signal from a radio frequency (RF) source;
- communicating at least a first portion of said signal from a transmit element to a receive element via a first path;
- communicating at least a second portion of said signal to a switch via a second path;
- providing at least one switch signal to said switch;
- using said at least one switch signal to alternate between at least first and second switch settings for said switch, wherein said first switch setting results in at least said first portion of said signal being provided to said receiver, and said second switch setting results in at least said second portion signal being provided to said receiver;
- wherein the combination of at least said first and second portions of said signal, as communicated over said first path and said second path, respectively, constitute said encoded measurement signal.

17. The method of claim 16, further comprising the steps of providing at least a second switch signal to a second switch, and using said at least said second switch signal to alternate between at least first and second switch settings for said second switch, wherein said first switch setting results in communicating said first portion of said signal to said transmit element, and said second switch setting results in communicating said second portion of said signal to said switch via said second path.

18. The method of claim 16, further comprising the step of splitting by a power splitter said signal into said first portion of said signal and said second portion of said signal.

19. The method of claim 17, wherein said steps of using said at least one switch signal to alternate between at least first and second switch settings and using said at least said second switch signal to alternate between at least first and second switch settings, further comprises setting said switch and said second switch in opposite configurations, disconnecting said RF source from said receiver.

20. The method of claim 16, further comprising the step of extracting information from said encoded measurement signal, said information including at least one of switch data, sync data, measurement timing, pulse profile, pulse timing, scan velocity, and signal quality.

* * * * *